Patented Feb. 3, 1953

2,627,494

UNITED STATES PATENT OFFICE 2,627,494

PRODUCTION OF BACITRACIN

Wilbur L. Keko, Ralph E. Bennett, and Fred C. Arzberger, Terre Haute, Ind., assignors to Commercial Solvents Corporation, Terre Haute, Ind., a corporation of Maryland No Drawing. Application October 15, 1949, Serial No. 121,636

11 Claims. (Cl. 195—96)

The present invention relates to a process for the preparation of bacitracin. More particularly, it relates to a process for producing high yields of bacitracin by the propagation of the bacitracin-producing strains of bacteria of the *Bacillus subtilis* group in a nutrient medium containing starch, calcium carbonate and a member selected from the group consisting of calcium lactate, calcium gluconate and calcium acetate, as more particularly described hereinafter.

It has been known that a strain of bacteria of the *Bacillus subtilis* group will synthesize bacitracin when propagated in the presence of oxygen on various liquid nutrient media, including tryptone broth, beef infusion broth, and the like. The first mention of bacitracin in the literature was an article by B. A. Johnson, H. Anker and F. L. Meleney in "Science," vol. 102, pages 376–377, entitled "Bacitracin: A New Antibiotic Produced by a Member of the *Bacillus subtilis* Group." U. S. Patent No. 2,457,887, granted January 4, 1949, to John T. Goorley, describes the production of bacitracin by the incubation of a medium containing soybean meal.

The previously disclosed processes for the production of bacitracin by fermentation have all been subject to certain disadvantages. For example, the yields of bacitracin were low, usually below 15 units per milliliter. The highest yield reported in the Johnson et al., article was 10 units per milliliter. This yield was obtained by utilizing a synthetic medium, which possesses the added disadvantage of being too expensive for commercial use.

We have now discovered that by using a medium containing as essential ingredients proteins, or amino acids, and starch in excess of the amount normally present in commercial soybean meal, calcium carbonate, and a member selected from the group consisting of calcium lactate, calcium gluconate and calcium acetate, much higher yields of bacitracin can be obtained in a shorter fermentation time than was possible from previously available media. The ingredients of our new fermentation medium are readily available and hence can be employed in producing bacitracin on a much larger scale than was previously possible.

In carrying out our invention, we utilize any medium containing the essential proteins, or amino acids, and add to it sufficient quantities of starch, calcium carbonate and organic salts of calcium so as to obtain maximum yields. As the protein, we use protein-containing materials such as cottonseed meal, cereal grains, oil meals, and flours and meals made from seeds from a wide variety of leguminous plants, such as peas, soybeans, field beans, and the like. Soybean meal is an excellent source of the necessary proteins.

When a carbohydrate source is added to a protein medium, various organic acids are produced from the carbohydrate by the bacteria during the fermentation, thus causing a low pH which inhibits production of bacitracin by the organism. We have found, however, that when starch is used as the carbohydrate source, and calcium carbonate is also added to the medium, the yields of bacitracin are materially increased. While bases such as sodium hydroxide, potassium hydroxide, calcium hydroxide, etc., may be used to raise the pH, these bases, even when used in very dilute solutions, are too active and any excess causes a marked rise in pH, a condition as detrimental to bacitracin production as is a low pH. It is possible to use these bases in dilute solution by adding, at regular intervals throughout the fermentation period, the exact quantity of solution necessary to neutralize the acids which have been formed. But such a procedure is obviously impractical for commercial production of bacitracin because of the rigid controls required. Not only is the incremental feeding of these bases impractical because of the expense entailed, but also because of the difficulty in controlling the pH and preventing contamination throughout the fermentation period. We have found that calcium carbonate may be used to control the pH without any of the disadvantages experienced with the use of stronger bases. Calcium carbonate may be added in excess at the beginning of the fermentation, and although the pH will rise, it will not rise to a pH at which bacitracin production is inhibited. The calcium carbonate acts as a buffer in maintaining the pH within the desired limits for maximum bacitracin yields, usually between 7.0 and 8.5 and preferably about 7.8. In addition, calcium carbonate serves the purpose of supplying calcium ions, which have been found to be necessary for maximum bacitracin production.

While a medium consisting of protein, starch and $CaCO_3$ in water gives better yields of bacitracin than had been previously thought possible, we have now found that the addition of calcium lactate, calcium gluconate or calcium acetate to our medium will give even greater increases in bacitracin production. The stimulatory effect of these organic salts of calcium seems to be due partly to the presence of the calcium ion and partly to the presence of the anion. The superiority of the calcium salts over the ammonium salts illustrates the first point and the superiority of calcium lactate over calcium gluconate and calcium acetate illustrates the latter.

In carrying out our invention, the basal medium containing proteins or amino acids is adjusted so that it contains about 0.25 to 1.0% and preferably about 0.5% by weight of starch based on the weight of the culture medium, about 0.1 to 1.5%, and preferably about 0.5% by weight of calcium carbonate on the same basis and about the following quantities of one of the group consisting of calcium lactate, calcium gluconate and calcium acetate:

Calcium lactate—0.25 to 5.0%
Calcium gluconate—0.1 to 7.5%
Calcium acetate—0.1 to 0.4%

The starch employed can be pure, commercial grade or any material containing sufficient quantities of starch. The fluidity of the starch used is not critical, however the rate of production of bacitracin is affected by this factor. The calcium carbonate and organic calcium salts can be used as pure salts or they can be introduced in the form of mixtures with other materials, containing the desired quantities of calcium salts.

Our new fermentation medium is prepared according to any of the known methods. For example, all the solid ingredients, i. e. proteins, starch, calcium carbonate and organic calcium salt, are added to the proper amount of water, so as to have the desired proportion of solids in the medium. The resulting mixture is then cooked for about 2 hours at about 120° C. The mixture is next cooled down to about 37° C., inoculated with an active culture of bacitracin producing bacteria of the Bacillus subtilis group (cf. Johnson et al., "Science" 102, 376-7) and fermentation permitted to take place. The fermentation is carried out in tanks aerated by introducing air into the medium through a sparger tube or other suitable device. Substantial quantities of bacitracin are ordinarily produced in less than one day, but maximum bacitracin yields are usually reached after about 1 to 2 days of fermentation under suitable conditions of temperature and aeration. At the conclusion of the fermentation the bacitracin can be recovered by known processes, such as by solvent extraction or by adsorbing the bacitracin from the liquid medium with an adsorbent, then eluting with a suitable eluting agent.

In order to compare yields of bacitracin obtained using different processes it was first necessary to establish a standard of measurement. The definition of a "unit" of bacitracin most frequently used, and the one we have used throughout our experiments, is that described in the aforementioned article by Johnson et al. There, one "unit" of bacitracin is designated as the amount, which when diluted 1:1024 in a series of 2-fold dilutions in 2 cc. of beef infusion broth, completely inhibits the growth of a stock strain (Chanin) of Group A hemolytic streptococcus when the inoculum used to seed the tubes is 0.1 cc. of a $10^{-2}$ dilution of an overnight culture of blood broth.

The following specific examples will further illustrate our invention:

EXAMPLE I

Fifty gallons of water were placed in each of a series of 80 gallon tanks. Each tank was jacketed on the bottom to facilitate temperature control. Four percent by weight of soybean meal was added to each tank, and in some of the tanks starch, calcium carbonate and calcium lactate were added, as shown in the table below. The contents of each tank were then cooked for 2 hours at 121° C. by applying steam to the jackets. After cooking, the mash was cooled to 37° C. and held at this temperature throughout the fermentation period. When each mash was cooled, it was inoculated with 0.1 to 0.3% by volume of a culture of bacitracin producing bacteria of the Bacillus subtilis group. Sterile air was supplied through a ring sparger at the rate of 10 c. f. m. After fermentation for 24 to 26 hours under the conditions described, bacitracin yields shown in the table below were obtained. Each figure given represents the average assay of several tanks.

*Table I*

| Medium | | | | 24–26 Hour Assay (Average) |
|---|---|---|---|---|
| Soybean Meal (Percent) | Starch (Percent) | Calcium Carbonate (Percent) | Calcium Lactate (Percent) | |
| 4 | | | | 5 |
| 4 | 1.0 | | | 2 |
| 4 | | 1.0 | | 12 |
| 4 | 0.5 | 0.5 | | 28 |
| 4 | 0.5 | | 0.5 | 32 |
| 4 | 0.5 | 0.5 | 0.5 | 67 |

EXAMPLE II

A series of media was prepared in 400 gallon stainless steel tanks. Each medium contained 4.0% by weight of soybean meal, 0.5% by weight of calcium carbonate, 0.5% by weight of starch and 0.5% by weight of calcium lactate in water. The contents of each tank were cooked for 2 hours at 121° C., then cooled to 37° C. as described in Example I. Two hundred gallons of this medium was pumped into each of a series of 400 gallon stainless steel tanks equipped with cooling coils for temperature control. Each medium was inoculated with 25 gallons of a culture of bacitracin producing bacteria of the Bacillus subtilis group and sterilized air supplied through a sparger tube at the rate of 25 c. f. m. After fermentation for 18 to 26 hours under the conditions described, bacitracin yields shown in the table below were obtained. The results of these runs show that higher yields of bacitracin than have heretofore been possible can now be obtained by using our new medium.

*Table II*

| Tank # | 18 hrs. Assay | 26 hrs. Assay |
|---|---|---|
| 1 | 46 | 82 |
| 2 | 68 | 80 |
| 3 | 55 | 79 |
| 4 | 50 | 86 |
| 5 | 43 | 92 |
| 6 | 56 | 81 |
| 7 | 53 | 82 |
| 8 | 60 | 74 |
| 9 | 62 | 81 |
| 10 | 56 | 79 |
| 11 | 66 | 82 |
| 12 | 63 | 79 |
| 13 | 55 | 78 |
| 14 | 52 | 80 |
| 15 | 68 | 92 |
| 16 | 52 | 80 |
| 17 | 53 | 78 |
| 18 | 49 | 79 |
| 19 | 69 | 81 |
| 20 | 72 | 78 |
| 21 | 56 | 81 |
| 22 | 55 | 87 |
| 23 | 53 | 77 |
| (Average) | 57 | 81 |

While the above examples describe the preferred embodiments of our invention, it will be understood that departures therefrom may be made within the scope of the specification and claims. In general it may be said that any modifications or equivalents that would ordinarily occur to those skilled in the art are to be considered as lying within the scope of our invention.

In accordance with the foregoing specification, we claim as our invention:

1. In a process for preparing bacitracin by the propagation of bacitracin producing strains of bacteria of the *Bacillus subtilis* group in a nutrient protein medium, the improvement which comprises propagating said organisms under aerobic conditions in a liquid protein medium containing starch in excess of the amount normally present in commercial soybean meal, calcium carbonate and a member selected from the group consisting of calcium lactate, calcium gluconate and calcium acetate.

2. In a process for preparing bacitracin by the propagation of bacitracin producing strains of bacteria of the *Bacillus subtilis* group in a nutrient medium, the improvement which comprises propagating said organisms under aerobic conditions in a liquid medium containing protein, from 0.25 to 1.0% by weight of starch, from 0.1 to 1.5% by weight of calcium carbonate and from 0.25 to 5.0% by weight of calcium lactate.

3. In a process for preparing bacitracin by the propagation of bacitracin producing strains of bacteria of the *Bacillus subtilis* group in a nutrient medium, the improvement which comprises propagating said organisms under aerobic conditions in a liquid medium containing protein, at least 0.25% by weight of starch, at least 0.1% by weight of calcium carbonate and at least 0.25% of calcium lactate.

4. In a process for preparing bacitracin by the propagation of bacitracin producing strains of bacteria of the *Bacillus subtilis* group in a nutrient medium, the improvement which comprises propagating said organisms under aerobic conditions in a liquid medium containing protein, an amount of starch in excess of the amount normally present in commercial soybean meal but less than about 1.0% by weight of starch, an effective amount less than about 1.5% by weight of calcium carbonate and an effective amount less than about 5.0% by weight of calcium lactate.

5. In a process for preparing bacitracin by the propagation of bacitracin producing strains of bacteria of the *Bacillus subtilis* group in a nutrient medium, the improvement which comprises propagating said organisms under aerobic conditions in a liquid medium containing from 2.0 to 6.0% by weight of protein, 0.25 to 1.0% by weight of starch, from 0.1 to 1.5% by weight of calcium carbonate and from 0.25 to 5.0% by weight of calcium lactate.

6. In a process for preparing bacitracin by the propagation of bacitracin producing strains of bacteria of the *Bacillus subtilis* group in a nutrient medium, the improvement which comprises propagating said organisms under aerobic conditions in a liquid medium containing from 2.0 to 6.0% by weight of soybean meal, 0.25 to 1.0% by weight of starch, 0.1 to 1.5% by weight of calcium carbonate and from 0.25 to 5.0% by weight of calcium lactate.

7. The process of claim 2, wherein the bacitracin is produced in submerged culture.

8. The process of claim 5, wherein the bacitracin is produced in submerged culture.

9. The process of claim 6, wherein the bacitracin is produced in submerged culture.

10. In a process for preparing bacitracin by the propagation of bacitracin producing strains of bacteria of the *Bacillus subtilis* group in a nutrient medium, the improvement which comprises propagating said organisms under aerobic conditions in a liquid medium containing from 2.0 to 6.0% by weight of protein, 0.25 to 1.0% by weight of starch, 0.1 to 1.5% by weight of calcium carbonate and from 0.1 to 7.5% by weight of calcium gluconate.

11. In a process for preparing bacitracin by the propagation of bacitracin producing strains of bacteria of the *Bacillus subtilis* group in a nutrient medium, the improvement which comprises propagating said organisms under aerobic conditions in a liquid medium containing from 2.0 to 6.0% by weight of protein, 0.25 to 1.0% by weight of starch, 0.1 to 1.5% by weight of calcium carbonate and from 0.1 to 0.4% by weight of calcium acetate.

WILBUR L. KEKO.
RALPH E. BENNETT.
FRED C. ARZBERGER.

REFERENCES CITED

The following references are of record in the file of this patent:

UNITED STATES PATENTS

| Number | Name | Date |
|---|---|---|
| 2,457,887 | Goorley | Jan. 4, 1949 |
| 2,498,165 | Johnson et al. | Feb. 21, 1950 |

OTHER REFERENCES

Gershenfeld: Bacteriology, 1945, Mack Pub. Co., Easton, Pa., pp. 53, 54.

Porter: Bacterial Chemistry and Physiology, John Wiley and Sons, 1946, p. 674.